US006739050B2

(12) United States Patent
Senile et al.

(10) Patent No.: US 6,739,050 B2
(45) Date of Patent: May 25, 2004

(54) METHODS FOR RETAINING GAS TURBINE ENGINE NOZZLE BASESHEETS

(75) Inventors: Darrell Senile, Oxford, OH (US); Bernard J. Renggli, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/684,275

(22) Filed: Oct. 13, 2003

(65) Prior Publication Data

US 2004/0040308 A1 Mar. 4, 2004

Related U.S. Application Data

(62) Division of application No. 10/061,629, filed on Feb. 1, 2002, now Pat. No. 6,658,854.

(51) Int. Cl.[7] ............................................... B21D 53/00

(52) U.S. Cl. .................................................. 29/890.01
(58) Field of Search ........................ 29/890.01; 60/771; 239/265.33, 265.37, 265.39

(56) References Cited

U.S. PATENT DOCUMENTS

| 4,637,550 | A | * | 1/1987 | Nash ...................... 239/265.37 |
| 5,000,386 | A | * | 3/1991 | Lybarger ............... 239/265.39 |
| 5,893,518 | A | * | 4/1999 | Bruchez et al. ............... 60/771 |
| 6,098,400 | A | * | 8/2000 | Estevas-Guilmain ... 239/265.39 |

* cited by examiner

Primary Examiner—Michael Koczo
(74) Attorney, Agent, or Firm—William Scott Andes; Armstrong Teasdale LLP; Robert B. Reeser, III

(57) ABSTRACT

A method for assembling a flap and seal system for a gas turbine engine exhaust nozzle including a plurality of backbone assemblies facilitates attaching a basesheet to a backbone. The method includes attaching an attachment system including at least one strap to a basesheet, and coupling the basesheet to a backbone using the attachment system strap.

5 Claims, 2 Drawing Sheets ered to combustor 16. Airflow from combustor 16 drives

METHODS FOR RETAINING GAS TURBINE ENGINE NOZZLE BASESHEETS

This application is a divisional of U.S. application Ser. No. 10/061,629, filed Feb. 1, 2002, now U.S. Pat. No. 6,659,854, which is hereby incorporated by reference.

GOVERNMENT RIGHTS STATEMENT

The United States Government has rights in this invention pursuant to Contract No. F336957-99-D-2050.

BACKGROUND OF THE INVENTION

This invention relates generally to gas turbine engine exhaust nozzles and more particularly, to methods and apparatus for retaining basesheet assemblies within gas turbine engine exhaust nozzles.

At least some known gas turbine engines include an exhaust nozzle including a variable geometry system. The variable geometry system adjusts an area of the exhaust nozzle through the use of flaps and seals. The flaps define discrete sectors of the flowpath, and the seals form the remaining flowpath between adjacent flaps. Because the exhaust nozzles are subjected to high temperatures and thermal gradients as a result of hot combustion gases exiting the engine, the variable geometry systems must maintain a coherent flowpath while shielding the structural components of the variable geometry system.

At least some known flap and seal systems consist of a backbone and a basesheet. The backbone secures the basesheet within the variable geometry system. To facilitate extending a useful life at high temperature operation, at least some known basesheets are fabricated from non-metallic materials, such as ceramic matrix composite (CMC) materials.

At least some known basesheets are attached to the backbone using mechanical fasteners, such as rivets or bolts. Over time, continued thermal expansion may create local stress concentrations within the bolted and riveted joints. Furthermore, continued thermal cycling may loosen such mechanical fasteners. Other known basesheets are attached to the backbone with embedded attachments. Such attachments rely primarily on an interlaminar tensile strength of the basesheet material to remain in place. Because such tensile strength may be a weakest load path through the basesheet, continued thermal cycling may loosen such embedded attachments and induce potentially damaging stresses into the basesheet.

BRIEF SUMMARY OF THE INVENTION

In one aspect, a method for assembling a flap and seal system for a gas turbine engine exhaust nozzle including a plurality of backbone assemblies is provided. The method comprises attaching an attachment system including at least one strap to a basesheet, and coupling the basesheet to a backbone using the attachment system strap.

In another aspect, an assembly for a gas turbine engine exhaust nozzle is provided. The assembly comprises a basesheet, a backbone, and an attachment sub-assembly. The attachment sub-assembly including at least one strap attached to the basesheet and configured to couple the basesheet to the backbone.

In a further aspect, a gas turbine engine is provided. The gas turbine engine comprises a variable engine exhaust nozzle including a flap and seal system coupled to the engine exhaust nozzle. The flap and seal system includes a basesheet, a backbone, and an attachment assembly. The attachment assembly is configured to couple the basesheet to the backbone, includes at least one strap attached to the basesheet for coupling the basesheet to the backbone.

DETAILED DESCRIPTION OF THE INVENTION

Figure 1:
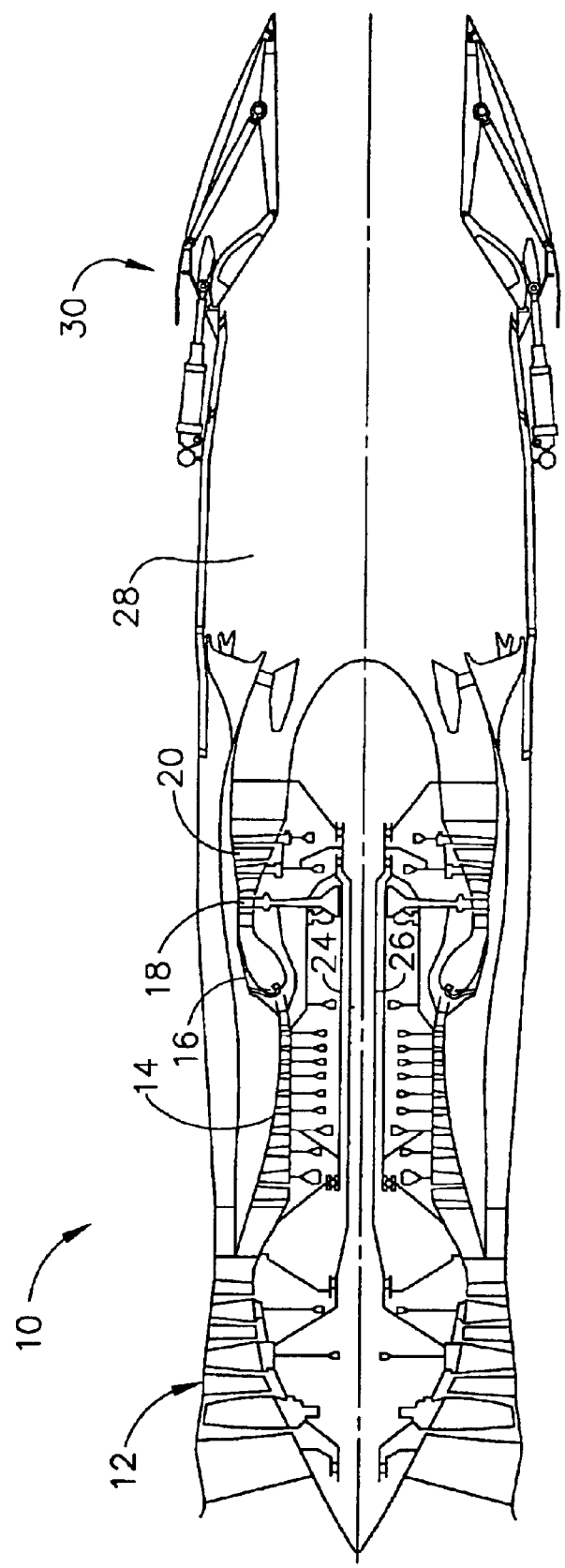
FIG. 1 is a schematic illustration of a gas turbine engine.

FIG. 1 is a schematic illustration of a gas turbine engine 10 including a fan assembly 12, a high pressure compressor 14, and a combustor 16. In one embodiment, engine 10 is a F414 engine available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system 28. Exhaust system 28 includes a variable geometry system 30.

Figure 2:
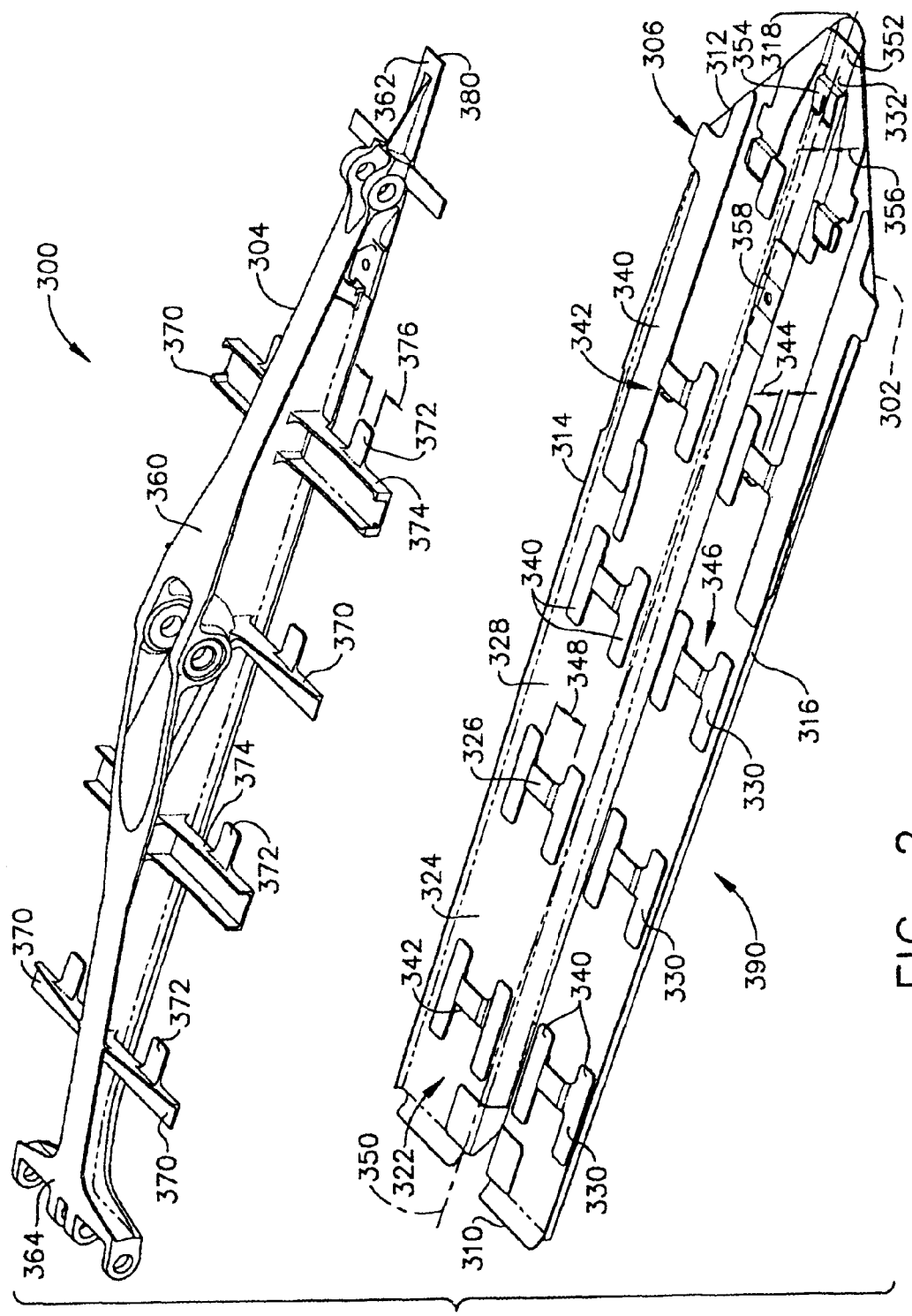
FIG. 2 is a perspective view of flap system that may be used with the engine shown in FIG. 1.

FIG. 2 is a perspective view of a flap system 300 that may be used with the engine shown in FIG. 1. Flap system 300 is coupled to an exhaust nozzle, such as exhaust system 28 (shown in FIG. 1) to facilitate shielding variable geometry system components from high temperature combustion gases exiting the engine. More specifically, flap system 300 is coupled to the exhaust nozzle such that a flowpath side 302 of flap system 300 is exposed to combustion gases exiting engine. Accordingly, flap system flowpath side 302 defines a portion of the flowpath through the nozzle.

Flap system 300 includes a plurality of backbones 304 and basesheet assemblies 306 extending circumferentially within the engine exhaust nozzle. More specifically, basesheet assembly 306 is coupled within the engine exhaust nozzle by backbone 304, and has a leading edge 310 and a trailing edge 312. Basesheet assembly leading and trailing edges 310 and 312, respectively, are coupled together by a pair of side edges 314 and 316. In the exemplary embodiment, side edges 314 and 316 converge to an apex 318 defined at basesheet assembly trailing edge 312. In the exemplary embodiment, side edges 314 and 316 are substantially parallel, and leading edge 310 is substantially perpendicular with respect to side edges 314 and 316. In an alternative embodiment, flap system 300 includes basesheet assemblies 306 and side edges 314 and 316 are non-parallel.

Flap system 300 also includes an attachment assembly 322 used to secure each basesheet assembly 306 to a respective backbone 304. Alternatively, attachment assembly 322 may be used to secure any basesheet assembly to backbone 304. In the exemplary embodiment, basesheet assembly 306 includes a unitary body 324 having flowpath side 302 and a back side 328. Attachment assembly 322 is coupled to body back side 328. More specifically, attachment assembly 322 includes a plurality of straps 330 and at least one mounting tab 332. Straps 330 are attached to body back side 328 and include a hanger portion 342 and an attachment portion 340. In the exemplary embodiment, each hanger portion 342 extends between adjacent attachment portions 340.

Straps 330 are spaced axially along body back side 328 between basesheet assembly leading and trailing edges 310 and 312, respectively. In the exemplary embodiment, straps 330 are arranged in pairs that are axially aligned adjacent opposite side edges 314 and 316 of basesheet assembly 306. Accordingly, in the exemplary embodiment, basesheet assembly 306 includes four pairs of straps 330. It should be noted that the number of straps 330 and the relative position of straps 330 with respect to basesheet assembly 306 are variable.

Straps 330 are securely attached to body back side 328 by attachment portions 340 which contact body back side 328, such that strap hanger portions 342 are not in contact with body back side 328. Rather, strap hanger portions 342 extend a distance 344 from body back side 328 and define a slot 346 that extends between a respective strap hanger portion 342 and body back side 328. In the exemplary embodiment, each strap hanger portion 342 extends an identical distance 344 from body back side 328. Alternatively, each strap hanger portion 342 extends a different distance 344 from body back side 328. Each slot 346 has a width 348 extending between attachment portions 342. Slot widths 348 are variably selected based on backbone 304. In the exemplary embodiment, each strap 330 is substantially H-shaped. In another embodiment, straps 330 have non-substantially H-shaped cross-sectional profiles.

Attachment assembly mounting tab 332 is positioned along a centerline 350 of basesheet assembly 304 that extends between leading and trailing edges 310 and 312, respectively. More specifically, mounting tab 332 is attached to basesheet assembly body back side 328 adjacent basesheet assembly trailing edge 312. Mounting tab 332 is contoured and includes an attachment portion 352 and a hanger portion 354 extending from portion 352. Mounting tab attachment portion 352 is securely attached to basesheet assembly 306 such that mounting tab attachment portion 352 is substantially flush against body back side 328 while hanger portion 354 remains a distance 356 from body back side 328.

Basesheet assembly 306 also includes an opening 358 extending through basesheet assembly 306 between flowpath and back sides 326 and 302. Opening 358 is sized to receive a fastener (not shown) therethrough for securely coupling basesheet assembly 306 to backbone 304.

Backbone 304 includes a body 360 extending axially between an aft end 362 and a leading end 364. Backbone body 360 includes a plurality of attachment arms 370 spaced axially along body 360 between leading and aft ends 364 and 362, respectively. Arms 370 extend substantially perpendicularly from body 360 and each includes a respective hanger bracket 372. In the exemplary embodiment, backbone arms 370 are arranged in pairs, such that opposing arms 370 within each pair extend outwardly from body 360 in opposite directions. Furthermore, in the exemplary embodiment, arms 370 are substantially co-planar.

Each hanger bracket 372 extends outwardly from each respective backbone arm 370 towards backbone body aft end 362. More specifically, each hanger bracket 372 extends substantially perpendicularly from a trailing edge side 374 of each arm 370. In the exemplary embodiment, hanger brackets 372 are identical. Alternatively, backbone 304 includes a plurality of different hanger brackets 372. Each hanger bracket 372 has a width 376 that is slightly smaller than each corresponding strap hanger portion slot width 348. Accordingly, each respective attachment assembly strap hanger portion slot 346 is sized to receive a corresponding respective backbone hanger bracket 372 therethrough.

Backbone aft end 362 includes a hanger flange 380 for coupling backbone aft end 362 with basesheet mounting tab 332. More specifically, hanger flange 380 is sized to be received between mounting tab hanger portion 354 and basesheet assembly body back side 328 when hanger flange 380 is coupled with mounting tab 332.

During assembly of flap system 300, initially attachment assembly 322 is attached to basesheet assembly 306 as described above. Each basesheet assembly 306 is then coupled to a respective backbone 304 using attachment assembly 322. More specifically, basesheet assembly 306 is initially positioned such that attachment assembly 322 and basesheet assembly back side 328 are adjacent a flowpath side 390 of backbone 304, and such that backbone 304 is substantially centered between basesheet assembly sides 314 and 316.

Basesheet assembly 306 is then translated with respect to backbone 302 such that basesheet assembly 306 is shifted towards backbone leading end 364. In an alternative embodiment, basesheet assembly 306 is shifted towards backbone aft end 362 during assembly of flap system 300. As basesheet assembly 306 is shifted, each respective backbone hanger bracket 372 is received within a corresponding basesheet assembly strap hanger portion 340. Furthermore, as hanger brackets 372 are extended through basesheet assembly strap hanger portion slots 346, backbone trailing end hanger flange 380 is received within basesheet assembly mounting tab 332, such that basesheet assembly 306 is coupled to backbone 304. Basesheet assembly 306 is then securely coupled to backbone 304 by the fastener extending through basesheet assembly opening 358.

During operation, as basesheet assembly 306 is exposed to hot combustion gases exiting the engine, backbone hook brackets 372 permit attachment assembly 322 and basesheet assembly 306 to thermally expand relative to backbone 304 while facilitating reducing thermal stresses induced between basesheet assembly 306 and backbone 304. More specifically, attachment assembly 322 facilitates thermal growth differences between backbone 304 and basesheet assembly 306. Furthermore, attachment assembly 322 facilitates reducing assembly costs of flap system 300.

In the exemplary embodiments described herein, an attachment system coupling a divergent flap backbone and a divergent flap basesheet has been illustrated. However, the attachment techniques described herein can be applied to a similarly constructed convergent flap backbone and convergent flap basesheet. Additionally, the attachment techniques described herein may be used to secure a convergent or divergent seal basesheet to a respective convergent or divergent seal backbone.

The above-described flap and seal system is cost-effective and highly reliable. The flap and seal system includes a basesheet assembly including an attachment assembly that couples the basesheet assembly to the backbone. The attachment assembly includes a plurality of straps that receive a plurality of corresponding backbone hanger brackets. As a result, the attachment assembly facilitates reducing thermal stresses between the basesheet assembly and the backbone in a cost-effective and reliable manner.

While the invention has been described in terms of various specific embodiments, those skilled in the art will recognize that the invention can be practiced with modification within the spirit and scope of the claims.

What is claimed is:

1. A method for assembling a flap and seal system for a gas turbine engine exhaust nozzle including a plurality of backbone assemblies, said method comprising:

attaching an attachment system including at least one strap to a basesheet; and coupling the basesheet to a backbone using the attachment system strap.

2. A method in accordance with claim 1 wherein the basesheet includes a flowside and an opposite back side, attaching an attachment system further comprising:

attaching a plurality of straps to the basesheet; and attaching at least one strap to the basesheet back side.

3. A method in accordance with claim 1 wherein coupling the basesheet to a backbone further comprises coupling the basesheet to the backbone such that each attachment system strap receives a hook extending from the backbone therethrough.

4. A method in accordance with claim 1 wherein coupling the basesheet to a backbone further comprises coupling the basesheet to the backbone using a mounting tab extending from the basesheet.

5. A method in accordance with claim 1 wherein coupling the basesheet to a backbone further comprises orienting the basesheet relative to the backbone with the attachment system.

* * * * *